United States Patent Office 3,111,510
Patented Nov. 19, 1963

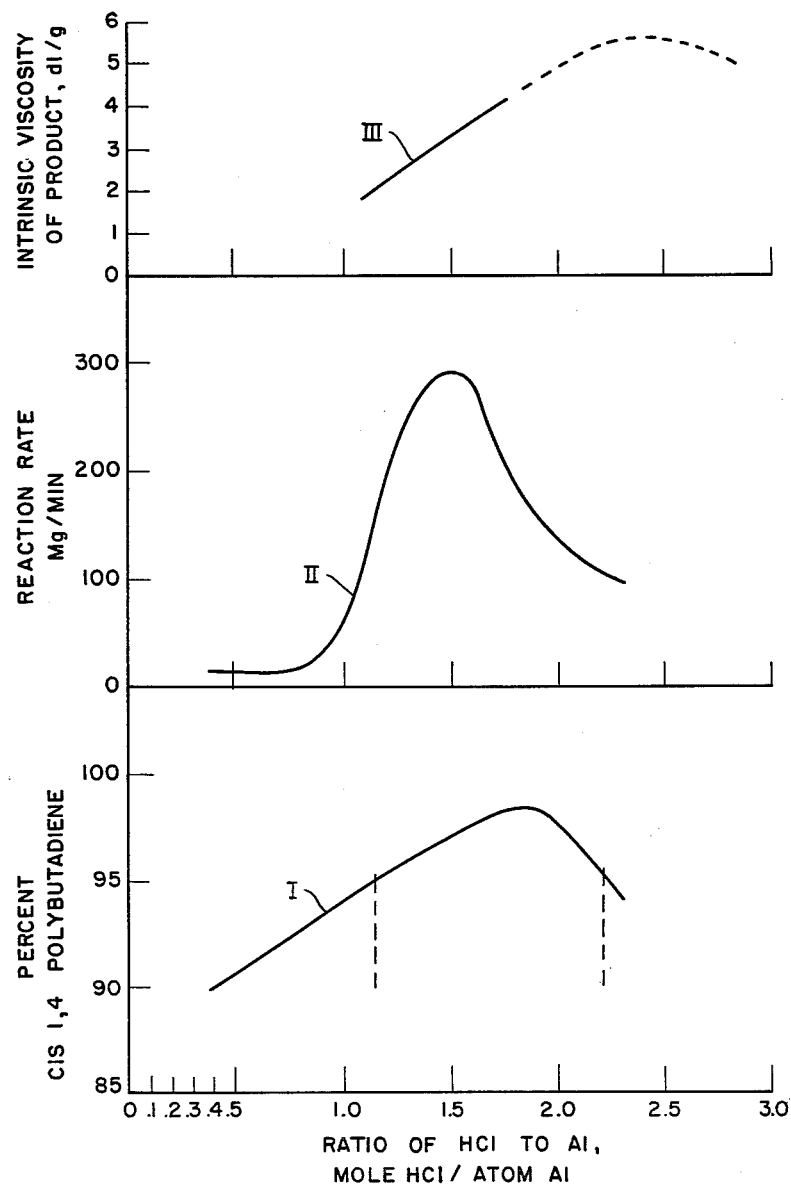
INVENTOR:
JAROSLAV G. BALAS
BY: Martin S. Baer
HIS ATTORNEY

3,111,510
POLYMERIZATION OF BUTADIENE WITH A COBALTOUS COMPOUND-ALUMINUM ALKYL-HYDROGEN HALIDE CATALYST
Jaroslav G. Balas, Orinda, Calif., assignor to Shell Oil Company, New York, N.Y., a corporation of Delaware
Filed June 27, 1960, Ser. No. 38,812
10 Claims. (Cl. 260—94.3)

This invention relates to the polymerization of diolefins. More particularly, it relates to improved processes for the polymerization of butadiene.

Workers in the art have recently been successful in polymerizing 1,3-butadiene under conditions which permit the monomer to polymerize to polybutadiene containing a very high proportion, e.g., above 95%, of the cis-1,4 polymer structure. It has been found that polymers having this composition can be cured to very useful rubbers which may be employed with advantage in many commercial applications including the manufacture of tires. These novel synthetic rubbers are superior to natural rubber in resilience, low temperature flexibility, set, abrasion resistance and age resistance.

Small differences in cis-1,4 content above 95% are very important in improving the ability of such rubber to crystallize under strain. Such ability to crystallize increases the commercial acceptability of such synthetic rubbers.

It is known that the ability of a polymer to crystallize increases significantly with its regularity, and it is believed that the primary strength properties of rubbery polymers, such as tensile strength, tear resistance, cut growth resistance and the like, improve with increasing ability to crystallize under strain. The primary strength properties are important to the practical utility of such polymers. The improvements resulting from very high crystallinity are most important for the practical utility of both gum and reinforced vulcanizates, particularly at elevated temperatures. They also tend to improve milling characteristics of the polymer. The significance of small differences in cis-1,4 contents above 95% is apparent from the following relationships. A polymer of 95% cis-1,4 structure consists of molecules in which 95 out of every 100 $C_4$ units are linked in cis-1,4 linkages. Assuming random distribution, chains of 19 $C_4$ units are linked in uninterrupted cis-1,4 fashion in a 95% cis-1,4 polymer and these chains are connected by a trans-1,4 or a 1,2-linkage. With increasing cis-1,4 content, average uninterrupted cis-1,4 sequence length increases greatly; it is, for example, 24 and 49 uninterrupted cis sequences at 96% and 98% cis-1,4 content, respectively.

One of the advantages of this invention is that it permits the production of polybutadiene of exceptionally high cis-1,4 content in reproducible fashion.

A measurement generally employed as an indication of molecular weight of polybutadiene is intrinsic viscosity (IV), determined in toluene at 25° C., expressed in deciliters per gram (dl./g.). The most desirable IV for commercially useful cis-1,4 polybutadiene is between 2 and 3. Values between 1 and 5 are in many cases acceptable. Polybutadiene produced according to this invention generally has an intrinsic viscosity in the acceptable range.

In recent work leading to the production of polybutadiene having above 95% cis-1,4 structure, it was found that such polymers can be produced by polymerizing 1,3-butadiene in a non-aqueous solution containing as essential catalytic ingredient a compound of cobalt or nickel, together with a co-catalyst. It was also found, however, that the control of butadiene polymerization with such catalytic systems is often quite difficult. In many instances runs were repeated at conditions in which all measured quantities were essentially identical and nevertheless substantial variations were found in the degree of conversion of butadiene which was obtained in a reasonable period of time as well as in the cis-1,4 content and intrinsic viscosity of the resulting products. It was attempted to overcome these difficulties by purifying the feed stocks, solvents and catalyst ingredients to remove all foreign components, including polar compounds, oxygen, water and more highly unsaturated compounds and the like which could lead to erratic results, but without consistent success.

Surprisingly, it has now been found that minute but critical amounts of hydrogen halide can exert an extremely important controlling effect on the above-described polymerization reaction when certain aluminum alkyls are used as co-catalysts. By adding a carefully controlled amount of hydrogen halide one can obtain superior results, including increased overall reaction rates, molecular weight control and reproducible substantial increase in content of cis-1,4 structure of the resulting polymer.

It is accordingly an object of this invention to provide an improved method for the polymerization of butadiene by means of catalysts which contain compounds of cobalt or nickel as their essential catalytic ingredients and certain aluminum alkyl compounds as essential co-catalysts. It is another object of this invention to provide a method for modifying catalyst systems consisting of a cobalt or nickel-containing polymerization catalysts and certain aluminum alkyl co-catalysts to increase its effectiveness in the cis-1,4 polymerization of butadiene. It is a further object to provide a method which permits controlling the polymerization of butadiene to produce at a relatively high rate a product having at least 95% and preferably at least 96% cis-1,4 structure. Other objects will become apparent from the following description of the invention.

In the description of the invention, the term "aluminum alkyl compound" or "aluminum alkyl" refers to aluminum alkyl halides as well as aluminum trialkyls. This usage is common in the literature and simplifies the description of the invention. Butadiene means, specifically, 1,3-butadiene monomer.

The halogen present in the halides of cobalt or nickel, the aluminum alkyl halides and the hydrogen halide used in the process of this invention is preferably chlorine. Since chlorine compounds are very satisfactory and usually the most economical to use, there is generally no reason to select compounds of other halogens. The invention will therefore be discussed mainly with reference to the use of chlorine compounds. Satisfactory results can, however, be obtained when the halogen is bromine. Iodine and fluorine are less preferred but can be used in systems where their compounds are sufficiently soluble.

Briefly stated, this invention is a process for polymerizing butadiene in a non-aqueous solution containing as an essential catalytic ingredient a compound of cobalt or nickel and as an essential co-catalyst an aluminum alkyl having no more than one halogen atom per alkyl group, in the presence of a critical, small amount of hydrogen halide. In a preferred embodiment, the process comprises polymerizing butadiene at a temperature in the range from −5° to 50° C. in a hydrocarbon solution containing as essential catalytic ingredient a compound of nickel or cobalt and as an essential co-catalyst a compound from the group consisting of $AlR_3$, $AlR_2X$, and $Al_2R_3X_3$ wherein R is an alkyl group and X is a halogen as defined above, in the presence of a critical, small amount of HX.

The sole FIGURE of the drawing quantitatively illustrates the effect of hydrogen chloride in the stereospecific polymerization of butadiene.

The polymerization of butadiene according to this invention is carried out in solution with a suitable non-aqueous diluent or solvent. The solvent preferably consists substantially of aliphatic, cycloaliphatic, and/or aromatic hydrocarbons. It is also possible to use as solvents certain halogen substituted hydrocarbons.

Cyclic hydrocarbons that may be employed as diluents include benzene, toluene, xylenes, ethyl benzene and other normally liquid aromatic compounds. Suitable hydroaromatic diluents include cyclohexane, alkyl substituted cyclohexanes and decalin. Aliphatic hydrocarbons which may be employed as diluents together with a cyclic hydrocarbon include hexane, octane, isooctane and the like. Unsaturated hydrocarbons free of acetylenic and conjugated ethylenic unsaturation, e.g., butene-1, butene-2, pentenes, hexenes and the like, are also suitable diluents when using the preferred catalysts. Suitable halogenated solvents are completely halogenated compounds such as carbon tetrachloride; and ring-halogenated aromatic such as chlorobenzene, bromobenzene, o-chlorotoluene, m-chlorotoluene and the like.

When mixed hydrocarbon diluents are employed, best results are obtained when an aromatic or cycloaliphatic hydrocarbon is present. The amount of benzene or other cyclic hydrocarbon present with an aliphatic diluent should be sufficient to permit the resulting polybutadiene to remain in solution in the liquid reaction mixture. This is readily determined in each instance and varies with the amount of butadiene charged, the temperature and the individual aliphatic solvent. For example, with butene as solvent, 8 to 10% by weight of benzene is generally sufficient. Saturated $C_4$ diluents may require admixture of 25 to 35% of benzene. Cycloparaffins are generally used in greater concentration than aromatics to serve the same purpose.

The essential catalytic compounds of this invention are compounds of cobalt or nickel. Most preferred as catalyst is cobalt chloride ($CoCl_2$). Other preferred catalysts are nickel chloride ($NiCl_2$) and other halides of cobalt and nickel. Next preferred are nitrates of cobalt and nickel. Soluble organic compounds of cobalt and nickel, such as cobalt or nickel naphthenates, octanoates or others may be employed. Other compounds which may be employed are the cobalt or nickel salts of oxygenated inorganic acids such as sulfates, phosphates, nitrates and carbonates; others are sulfides, cyanides and sulfocyanides and salts of organic acids such as acetates, propionates, butyrates, oxalates and benzoates. The cobalt or nickel compounds are believed to be present in the active catalysts in their divalent form even though the catalyst may be prepared from a trivalent compound, e.g., cobaltic acetylacetonate.

The catalysts may be prepared by using a hydrocarbon soluble compound of cobalt or nickel, e.g. a naphthenate or alcoholate or the like. Alternatively the cobalt or nickel salt may be solubilized by using a suitable complexing agent, e.g. an alkyl phosphate or alkyl phosphite or by solubilizing it by reaction with an acidic metal halide, preferably $AlX_3$. These ingredients are believed to form a complex when mixed in the presence of the hydrocarbon diluent, the complex being soluble in the hydrocarbon.

The cobalt and nickel compounds are used in certain combinations with other ingredients which affect the action of the catalyst. An essential ingredient in the process of this invention is a "co-catalyst" selected from a limited group of aluminum alkyls.

Although a great variety of co-catalysts have been found to be effective with cobalt or nickel compounds in the polymerization of diolefins in anhydrous media, the present invention is directed only to those reaction systems in which the co-catalyst has the composition $Al_aR_bX_c$ wherein R is an alkyl group, X is a halogen and the subscripts meet the following conditions $a = \frac{1}{3}(b+c)$; $a > 1$; $b > 1$; $c > 0$; and $b > c$.

This definition includes the aluminum trialkyls ($AlR_3$), aluminum dialkyl monohalides ($AlR_2X$) and aluminum sesquihalides ($Al_2R_3X_3$). It excludes aluminum monoalkyl dihalides. It has been found that, unlike the above defined compounds, the monoalkyl dihalides are not responsive to the addition of controlled small amounts of hydrogen halide for the production of cis 1,4-polybutadiene of increased cis content at increased rates.

In the above defined co-catalysts, R is preferably an alkyl radical of from 1 to 10 carbon atoms and most preferably one having from 2 to 4 carbon atoms. The ethyl group is particularly suitable. The isopropyl group is also very useful. In general the alkyl groups can be methyl, ethyl, n-propyl, isopropyl, n-butyl, sec.-butyl, tert.-butyl, n-octyl, n-decyl, 2-ethylhexyl, and all the other available unbranched or branched alkyl groups. Higher groups, e.g., dodecyl or cetyl may be employed. There is generally no reason to select any except the most common and readily available aluminum alkyls of the defined type.

The aluminum alkyl co-catalyst is believed to perform several separate functions in the polymerization of butadiene. One of these functions is to "scavenge" reactive impurities present in the reaction mixture in trace amounts. The main function of the aluminum alkyl is to co-act in some not yet completely understood manner with the cobalt or nickel compound to produce an effective catalyst which acts to direct the polymerization of butadiene to produce an extremely high proportion of cis 1,4 structure in the resulting polymer.

This invention is not to be limited by any theoretical explanation of the surprising ability of limited amounts of hydrogen halide to increase the stereospecificity of the above described catalyst system for butadiene polymerization. However, the following consideration may assist toward a better understanding of the invention. The active catalytic system of the process of this invention contains, in addition to cobalt or nickel, aluminum atoms (Al), alkyl groups (R) and halogen atoms (X). The Al, R and X are present, at least in part, as constituents of the aluminum alkyl which is added as co-catalyst. In part they may be present by virtue of added HX or $AlX_3$. The reaction of aluminum alkyl halides with trace impurities, such as water or acetylenes, also affects the ratio in which Al, R and X exist. It is believed that there is a fairly critical relationship between these components. This relationship appears to require that the effective amount of X be substantially greater than the effective amount of R. The ratio of the three components Al, R and X is adjusted, in accordance with this invention, by adding HX to the reaction mixture.

The amount of hydrogen halide required to be added for best results is generally in the range between 0.3 and 3.1 moles HX per atom of Al in the reaction mixture although useful effects may sometimes be obtained with even lower proportions of HX, e.g., as low as 0.1 mole per atom. As a general rule, the amount of HX added is such that it does not substantially exceed the ratio of one mole of HX per alkyl group in the aluminum alkyl. As illustrated in the examples below, suitable ratios of HX to Al are about 1.2 to 2.3 moles HCl/mole AlR$_2$X, about 0.3 to 1.1 moles HCl/mole Al$_2$R$_3$X$_3$, and about 1.9 to 3.1 moles HCl/mole AlR$_3$. In view of the many factors that can affect the reaction, it is advisable to determine the optimum ratio separately for each run in a commercial operation.

The catalysts used in the process of this invention are very simple to prepare. If a soluble complex is to be used, all that is required is that the catalyst components be mixed in a suitable diluent and the complex be permitted to form. The catalyst complex formation is hastened if the solvent containing the catalyst components is refluxed for a period ranging from a few minutes to a few hours. Alternatively, the catalyst can be formed from the components by merely allowing the mixture to stand for several hours. Best results are obtained when the maximum amounts of the catalyst components react and go into solution in the solvent. In the most preferred embodiment, the catalyst components are added to the hydrocarbon, the mixture is heated and thereafter excess solids, if any, are removed by filtering, centrifuging or decanting. The catalyst is then in a soluble form in the hydrocarbon. When AlCl$_3$ is employed as complexing agent for cobalt or nickel, the final catalyst solution, if made in benzene, contains a 2:1 to 4:1 molar ratio of AlCl$_3$ to cobalt or nickel salt. If made in a nonaromatic solvent, the ratio of AlCl$_3$ to Co or Ni is substantially higher. This is generally not desirable and it is therefore preferred to use an aromatic, such as benzene or toluene as solvent in the preparation of catalyst solution. However, any of the solvents described above as suitable for the reaction mixture may be used if desired.

The amount of cobalt or nickel in solution is suitably in the order of 5 to 2,000 parts per million. For practical reasons it is generally preferred to prepare a solution which is substantially saturated with respect to cobalt or nickel and to dilute a portion of the solution before adding it to the reaction mixture.

If desired, the aluminum alkyl co-catalyst may be added to the solution of cobalt or nickel catalyst in order to prepare an effective composite catalyst. It is preferred, however, to add the solution of cobalt or nickel compound and the aluminum alkyl, preferably also in solution, as separate portions or streams to the reaction zone, or to combine them into a single portion or stream just before they are added to the reaction mixture.

In all catalyst preparations the components are preferably employed in substantially pure anhydrous form. Small concentrations of some impurities may, however, be tolerated in the catalyst components.

The cobalt or nickel catalysts may be added as such or in combination with a solid carrier, or in solvent solution. It is usually preferred to employ a solvent solution.

The amount of the nickel or cobalt catalyst employed to catalyze the polymerization may vary. In general, only small amounts, e.g., amounts ranging from about $1 \times 10^{-8}$ to about $1 \times 10^{-4}$ atoms of nickel or cobalt per mol of the conjugated dienes are very satisfactory. Expressed on a weight basis, amounts of 0.1 to 50 p.p.m. cobalt or nickel, based on the total reaction mixture, have been found useful, and 0.2 to 3 p.p.m. are especially preferred.

The amount of aluminum alkyl co-catalyst employed may also vary. In a system substantially completely free of impurities, from 10 to 20 p.p.m. aluminum alkyl, based on the total reaction mixture, is usually sufficient. It is generally preferred to employ amounts in the range from 50 to 300 p.p.m., but amounts up to 5,000 p.p.m. or more may be used if desired.

The concentration of butadiene in the reaction mixture is suitably in the range between 10 and 30% by weight. Variations within this range may affect the molecular weight of the polymer. At relatively low concentrations of butadiene the viscosity of the polymer solution and the molecular weight of the polymer will be relatively lower. In a continuous system, it is suitable to maintain a combined concentration of butadiene monomer and polymer at about 20% wt. while maintaining about 50% conversion. In a batch system, it is suitable to charge 15% wt. butadiene and proceed to as high as 80% conversion.

The reaction temperature may differ with different catalysts and solvents. It is chosen in the range from −40° to 150° C., preferably from about −20° to about 100° C. Temperatures between about 5° and 50° are most preferred, as they are most convenient and generally give products having a somewhat higher proportion of the cis-1,4 addition product than is obtained at higher temperatures.

The most convenient operating pressure to be maintained in the reactor is that which is created by the system. This will vary depending upon the specific nature of conjugated diene, the solvent and their respective amounts. Such pressures are termed "autogenic" pressures. The pressure is usually in the range from 0 to 50 p.s.i.g. If desired, higher or lower pressures may be employed.

The process is conducted in an inert atmosphere. This is preferably accomplished by first sweeping out the reaction zone with an inert gas. Suitable inert materials include nitrogen, methane, and the like.

The process is conducted under substantially anhydrous conditions which are achieved by carefully drying the reactants, solvents, and the reaction vessel and maintaining the customary precautions during the reaction to keep water out of the reaction vessel. It is important to use extremely effective drying methods such as, for example, distillation, beds of molecular sieves, calcium hydride, or a combination of several drying methods to reduce the water content of all components to a value which is preferably no more than 1 part of water per million.

Since hydrogen halide addition usually involves adding extremely small quantities of hydrogen halide in a continuous or semi-continuous manner and providing for its distribution in a large reactant mass, it is generally preferred to add hydrogen halide in solution in a suitable hydrocarbon solvent, preferably benzene. HCl, for example, is soluble in benzene and a controlled amount of HCl can be readily added in the form of a solution in benzene containing, for example, approximately 30 millimoles of HCl per liter of benzene.

Although it is preferred to maintain the extremely low water concentration of less than 1 p.p.m., the present invention is also applicable when there is somewhat more water in the system. It is generally found that the amount of HCl required for best results is reduced as the water concentration increases. The ratio is approximately 0.5 less mole of HCl per extra mole of water. However, this depends also on the amount and type of aluminum alkyl present. The best proportions are readily determined for any particular system of reactants and catalyst.

The reaction mixture is preferably agitated during the course of the reaction. This may be accomplished by mounting the reactor on a rocker or by use of suitable stirrers. Further, the reactor is preferably equipped with suitable inlets for feeding the monomer and a set of inlets and outlets for circulating an inert gas to purge air from the vessel. A separate inlet may be supplied whereby catalyst may be added during the course of the reaction. If continuous operations are to be employed then the inlet for catalyst and solvent is necessary as well as an outlet for the continuous withdrawal of polymer solution.

At the completion of the reaction, the mixture is treated to deactivate the metal catalyst. This suitably includes the addition of a proton donor, i.e., a material having active hydrogen, such as water, mineral or organic acids, alcohols, amines and the like. It can be accomplished by addition of a small amount of isopropyl alcohol, e.g., 0.1 to 2 percent by volume or more. A larger amount of the alcohol may then be added to coagulate the polymer.

To illustrate the manner in which the invention may be carried out, the following examples are given. It is to be understood, however, that the examples are for the purpose of illustration and the invention is not to be regarded as limited by any of the specific conditions cited therein.

In these examples, the microstructure of the polymer was determined by infrared analysis of a film prepared by evaporating 1 percent solution of polymer in benzene to dryness on a salt plate in the aperture of a standard plate holder. The film was scanned in the infrared on a recording instrument. Using the asorbances at 10.35, 11.0 and 13.60 microns for trans-1,4, 1,2 and cis-1,4 unsaturation respectively, the total intensity was normalized and the microstructure was calculated. The iodine number of the polymer showed it to have substantially 100 percent of the theoretical unsaturation.

EXAMPLE 1

This example illustrates the effect of added hydrogen chloride in the range from 0.39 to 2.33 moles per atom of aluminum in the polymerization of butadiene in a benzene solvent, the catalyst being the reaction product of cobalt chloride and aluminum chloride and the co-catalyst being aluminum diethylchloride.

For this series of experiments the catalyst is prepared by mixing 5 grams of $CoCl_2$ and 14 grams of $AlCl_3$ in sufficient benzene to result in a total of 1,000 grams of mixture. The mixture is stirred and heated in a dry inert atmosphere at a temperature in the range between 25 and 80° C., preferably at about 70° C., for 6 to 10 hours. This results in a green solution which contains about 2,000 parts per million of cobalt and contains aluminum and cobalt in a molar ratio of about 3:1.

A series of experiments was carried out in the following manner: 50 ml. of dry deaerated benzene was placed in dry glass flask. To this there was added a predetermined amount of HCl in the form of a $3 \times 10^{-2}$ molar solution in benzene. 130 micromoles of aluminum diethyl chloride was added to the flask in the form of a 10% by weight solution in benzene. In 15 minutes after the addition of the aluminum alkyl, sufficient cobalt catalyst solution, prepared as described above, was added to provide 2 micromoles of cobalt. The solution was then allowed to stand 15 to 30 minutes and was then saturated with butadiene at atmospheric pressure. The flask was stirred while being maintained at a temperature of 25° C. until an appropriate degree of conversion of butadiene to polybutadiene had been obtained. Generally the reaction was stopped after about 10% of the butadiene present had been polymerized. Much higher conversions can be conveniently obtained in a more vigorously agitated reactor. The catalyst was deactivated by adding to the flask a solution of 10% isopropyl alcohol in benzene. The isopropyl alcohol serves to deactivate the catalyst. For the production of rubber which is to be stored, it is convenient to add 1% phenyl-beta-naphthylamine (PBNA) or some other antioxidant in benzene at the same time to stabilize the polymer against oxidation. However, PBNA interferes with the infrared analysis of the polymer and is therefore omitted in experimental runs. Polymer was recovered by driving off benzene by evaporation to dryness and was then analyzed for its cis-1,4 content by infrared analysis. The intrinsic viscosity (IV) of the polymer was determined in the conventional manner. The percent of conversion was determined by measuring the amount of solids produced. As a measure of the overall rate of reaction, the number of milligrams of polymer produced per minute is used. The mechanism of the polymerization in this process is believed to be complex, and the reaction rate is intended mainly as a practical indicator of the degree of conversion obtainable in a given time.

In the series of experiments of this example the amount of cobalt employed in the form of the above-described cobalt chloride-aluminum chloride complex was about 2 parts of Co per million of reaction mixture. The concentration of aluminum diethyl chloride was about 270 parts per million.

The results of a series of experiments carried out in the above-described manner, varying only the ratio of HCl to aluminum by controlling the HCl addition, are shown in Table 1.

Table 1

| Experiment No. | HCl in Reaction Mixture | | Reaction Rate, mg./min. | Polymer Structure | | | IV, dl./g. |
|---|---|---|---|---|---|---|---|
| | micromoles | moles per atom Al | | Cis-1, 4, percent | trans-1, 4, percent | 1, 2, percent | |
| I-1 | 50 | 0.39 | 19 | 90.0 | 1.9 | 8.1 | |
| I-2 | 100 | 0.77 | 19 | 92.3 | 2.0 | 5.7 | |
| I-3 | 150 | 1.15 | 100 | 94.8 | 1.4 | 3.8 | 2.0 |
| I-4 | 200 | 1.54 | 294 | 97.0 | 1.0 | 2.0 | 3.5 |
| I-5 | 230 | 1.77 | 190 | 98.2 | 0.6 | 1.2 | 4.2 |
| I-6 | 300 | 2.31 | 98 | 93.6 | 5.1 | 1.3 | |

The data of Table 1 are plotted in the drawing.

Curve I illustrates the effect of HCl on cis-1,4 content of the polymer. The ratio of HCl to Al which secured cis-1,4 contents above 95% is in the range between about 1.2 and 2.2.

Curve II illustrates the effect of HCl on the overall reaction rate in the same system. The shape of this curve shows the rate to be even more sensitive to HCl concentration than is the cis-1,4 content. Here, again, the rates between 1.2 and 2.2 HCl:Al are satisfactory.

Curve III illustrates the effect of HCl concentration on the molecular weight of the product, as indicated by intrinsic viscosity. The dashed portion is a projection, based on experience from other experiments. Many factors affect this property, and there is often some scatter of points above and below the trend line, even in a single series of runs.

Changes in reaction conditions, reactants, contaminants present and the like may affect the above relationships by displacing the location of the curves from the origin along the x-axis or by requiring a different numerical scale along the x-axis. This does not destroy the basic relationships involved.

It is apparent from this series of experiments that the molar ratio of HCl to Al which leads to most satisfactory results in this particular case is in the range of 1.7±0.5.

EXAMPLE II

A further series of experiments was carried out, employing a catalyst prepared in the same manner as in Example I with the difference that the aluminum alkyl was aluminum ethyl sesquichloride ($Al_2Et_3Cl_3$). Ratios of HCl to Al ran from 0.39 to 1.15:1. In this series, the maximum cis-1,4 content—98.5%—was reached at a ratio of about 0.8. At a ratio of 1.1, the cis content was below 95% and the reaction rate had dropped to 157 mg./min. from a high 375 mg./min. at a 0.39 ratio.

EXAMPLE III

Example I is repeated with $AlEt_3$ in lieu of $AlEt_2Cl$. A similar series of data is obtained, relative to Example I. The range resulting in cis contents above 95% and satisfactory high reaction rates is at HCl:Al ratios with range from 1.9 to 3.1.

Similar results are obtained when substituting $CoBr_2$ for $CoCl_2$, $AlBr_3$ for $AlCl_3$, $AlEt_2Br$ for the $AlEt_2Cl$ and HBr for HCl in Example I; also when substituting $Al(i-Pr)_2Cl$ or $Al(i-Bu)_2Cl$ or $Al(n-C_{10}H_{22})_2Cl$ for $AlEt_2Cl$ in Example I.

Similar results are also obtained when substituting a mixture for 75% butene-1 and 25% benzene for the benzene solvent of Example I, and when substituting cyclohexane for the benzene solvent of Example I. In each case, however, the catalyst is prepared as a solution in benzene.

EXAMPLE IV

Example I is repeated with substitution of a catalyst consisting of cobalt acetylacetonate dissolved in benzene in lieu of the $CoCl_2$—$AlCl_3$-benzene catalyst solution. It is found that addition of about 0.3 to 3.1 moles HCl per atom Al results in variation of cis-1,4 content and reaction rate, with a maximum occuring within that range.

Similar results are obtained when using as catalyst a solution of cobalt octanoate in benzene. The range resulting in cis contents above 95% and satisfactorily high reaction rates is at HCl:Al ratios with range from 1.9 to 3.1.

EXAMPLE V

This example illustrates the application of this invention in the production of polybutadiene on a semi-commercial scale. The reactor is a 100 gallon vessel provided with a suitable stirrer. The reactor is dried as completely as possible by circulating dry benzene therethrough, followed by a solution of aluminum ethyl sessquichloride.

The benzene solvent and the butadiene employed are freed of impurities and are separately dried to a water content of no more than 1 part per million of water by passing them in series through beds of sodium hydroxide supported on asbestos, anhydrous calcium sulfate and zeolitic calcium aluminum silicate which is commercially available from Linde Chemical Company as 13X molecular sieve.

The catalyst is a reaction product of $CoCl_2$ and $AlCl_3$ dissolved in benzene. The proportions and method of preparation are substantially the same as described in Example I.

Aluminum diethyl chloride is obtained as a commercial product and dissolved in benzene to provide a solution of about 10% concentration.

The production of polybutadiene is carried out in the above-described reactor and with the above-described reagents in a series of successive batch runs. Typically, about 900 lbs. of benzene is placed in the reactor and sufficient aluminum diethyl chloride is added in the form of benzene solution to provide a final concentration based on the total reaction mixture of 200 parts per million. A predetermined amount of HCl, preferably about 1.7 moles per atom Al, is then added in the form of a benzene solution which is about $3 \times 10^{-2}$ molar in HCl. Sufficient catalyst solution is then added to provide 2 parts per million cobalt based on the total reaction mixture. Immediately after the addition of the cobalt catalyst, flow of butadiene to the reactor is commenced and butadiene is added at a rate of about 20 pounds per hour during a four hour period. The reactor is stirred and maintained at the lowest practical temperature in the range of 15 to 35° Cl. during the period of butadiene addition and for an additional 4 to 5 hours. The catalyst is then deactivated, an oxidation inhibitor such as PBNA is added, and polymer is recovered by removing solvent from the resulting polymer solution. Similar results are obtained when using aluminum ethyl sesquichloride in place of aluminum diethyl chloride, except that the best results are obtained with about 0.8 mole HCl per atom of Al.

The polymers prepared by the process of the invention may be utilized for many important industrial applications. The polymers may be used, for example, in the preparation of molded rubber articles, such as tires, belts, tubes and the like or may be added alone or with other polymeric materials to known rubber compositions to improve specific properties, such as resilience. The polymers of the invention may also be used in the preparation of impregnating and coating compositions or may be combined with asphalts, tars and the like to form surfacing compositions for roads and walkways.

In forming rubber articles from the polymers produced by the process of the invention, it is preferred to compound the polymer with the necessary ingredients, such as, for example, tackifiers, plasticizers, stabilizers, vulcanizing agents, oils, carbon black and the like, and then heat to effect vulcanization. Preferred vulcanizing agents include, among others, sulfur, sulfur chloride, thiuram polysulfides and other organic polysulfides. These agents are preferably used in amounts varying from about 0.1 part to 10 parts per 100 parts of rubber. Vulcanization temperatures preferably range from about 100° C. to about 175° C. Preferred temperatures range from about 125° C. to 175° C. for a period of 15 to 60 minutes.

I claim as my invention:

1. A process for producing polybutadiene containing at least 95% cis-1,4 structure which comprises polymerizing 1,3-butadiene at a temperature in the range from —5° to 50° C. in a hydrocarbon solution containing less than 1 p.p.m. of water and at least 8% by weight of a cyclic hydrocarbon solvent, sufficient to maintain the polybutadiene product in solution, and containing as essential catalytic ingredient a compound of a metal selected from the group consisting of cobalt and nickel, the catalytically active metal being a hydrocarbon solution and in the divalent state, and a co-catalyst selected from the group consisting of (a) aluminum trialkyls, (b) aluminum dialkyl halides, and (c) aluminum alkyl sesquihalides, the alkyl groups in said co-catalysts containing from 1 to 10 carbon atoms, in the presence of an added amount of hydrogen halide in the range from 0.3 to 3.1 molecules per aluminum atom of said co-catalyst, whereby polymer of increased cis-1,4 structure is produced.

2. A process for producing polybutadiene containing at least 95% cis-1,4 structure which comprises polymerizing 1,3-butadiene at a temperature in the range from —5° to 50° C. in a hydrocarbon solution containing less than 1 p.p.m. of water and at least 8% of an aromatic hydrocarbon solvent, sufficient to maintain the polybutadiene product in solution, and containing as essential catalytic ingredient the hydrocarbon soluble reaction product of a compound from the group consisting of the chlorides of divalent nickel and divalent cobalt and a co-catalyst selected from the group consisting of (a) aluminum trialkyls, (b) aluminum dialkyl chlorides, and (c) aluminum alkyl sesquichlorides, the alkyl groups in said co-catalysts containing from 1 to 10 carbon atoms, in the presence of an added amount of hydrogen chloride in the range from 0.3 to 3.1 molecules per aluminum atom of said co-catalyst, whereby polymer of increased cis-1,4-structure is produced.

3. A process according to claim 2 in which said temperature is about 25° C.

4. A process according to claim 2 in which said temperature is in the range from 15° to 35° C., and in which said solution contains benzene as said aromatic solvent and contains as catalytic ingredient and co-catalyst, respectively, cobalt chloride and aluminum trialkyl, and in which the HCl:Al mole ratio is between about 1.9 and 3.1.

5. A process according to claim 4 in which said temperature is about 25° C.

6. A process according to claim 2 in which said temperautre is in the range from 15° to 35° C., and in which said solution contains benzene as said aromatic solvent and contains as catalytic ingredient and co-catalyst, respectively, cobalt chloride and aluminum dialkyl chloride, and in which the HCl:Al mole ratio is between about 1.2 and 2.3.

7. A process according to claim 2 in which said temperature is in the range from 15° to 35° C., and in which said solution contains benzene as said aromatic solvent and contains as catalytic ingredient and co-catalyst, respectively, cobalt chloride and aluminum alkyl sesquichloride, and in which the HCl:Al mole ratio is between about 0.3 and 1.1.

8. A process for producing polybutadiene containing at least 96% cis-1,4 structure which comprises polymerizing 1,3-butadiene at a temperature in the range from −15° to 35° C. in a hydrocarbon solution containing less than 1 p.p.m. of water and at least 8 percent by weight benzene, sufficient to maintain the polybutadiene product in solution, and containing as catalyst the hydrocarbon soluble reaction product of $CoCl_2$ and $AlCl_3$ in an amount of 0.1 to 50 p.p.m. of cobalt and two to four moles of $AlCl_3$ per mole of $CoCl_2$ and as co-catalyst 50 to 300 parts per million of aluminum ethyl sesquichloride, based on the reaction mixture, while controlling the total amount of hydrogen chloride added to the reaction mixture to an effective value in the range from about 0.3 to 1.1 molecules per aluminum atom of said aluminum ethyl sesquichloride whereby polymer of increased cis-1,4 structure is produced.

9. A process according to claim 8 in which said temperature is in the range from 15° to 35° C.

10. A process according to claim 8 in which said temperature is about 25° C.

References Cited in the file of this patent

UNITED STATES PATENTS

| | | |
|---|---|---|
| 2,912,425 | Bailey et al. | Nov. 10, 1959 |
| 2,971,950 | Natta et al. | Feb. 14, 1961 |
| 3,046,265 | Hazen et al. | July 24, 1962 |
| 3,066,126 | Porter et al. | Nov. 27, 1962 |

FOREIGN PATENTS

| | | |
|---|---|---|
| 543,292 | Belgium | June 2, 1956 |
| 552,578 | Belgium | May 14, 1957 |
| 1,175,201 | France | Nov. 10, 1958 |
| 1,215,953 | France | Nov. 23, 1959 |
| 579,689 | Belgium | Dec. 15, 1959 |